United States Patent [19]

Greeson

[11] Patent Number: 4,555,709

[45] Date of Patent: Nov. 26, 1985

[54] INK RECONSTITUTION SYSTEM AND METHOD FOR INK DROP PRINTER

[75] Inventor: Arnold J. Greeson, Midlothian, Tex.

[73] Assignee: The Mead Corporation, Dayton, Ohio

[21] Appl. No.: 599,375

[22] Filed: Apr. 12, 1984

[51] Int. Cl.[4] ........................ G01D 9/00; G01D 15/16

[52] U.S. Cl. ........................................ 346/1.1; 346/75

[58] Field of Search ........................... 346/1.1, 75, 140

[56] References Cited

U.S. PATENT DOCUMENTS

| | | | |
|---|---|---|---|
| 3,761,953 | 9/1973 | Helgeson et al. | 346/75 |
| 3,771,568 | 11/1973 | Bischoff et al. | 346/75 |
| 3,835,881 | 9/1974 | Dal et al. | 137/389 |
| 3,930,258 | 12/1975 | Dich et al. | 346/75 |
| 4,067,020 | 1/1978 | Arway | 346/75 |
| 4,121,222 | 10/1978 | Oiebolt et al. | 346/75 |
| 4,130,126 | 12/1978 | Chocholatz et al. | 346/75 |
| 4,190,846 | 2/1980 | Yamamoto et al. | 346/75 |
| 4,337,468 | 6/1982 | Mizuno | 346/75 |

*Primary Examiner*—E. A. Goldberg
*Assistant Examiner*—M. Reinhart
*Attorney, Agent, or Firm*—Biebel, French & Nauman

[57] ABSTRACT

An ink reconstitution system and method for ink drop printers in which an essentially closed delivery system supplies ink under pressure to a printing bar, and a catcher collects unprinted ink. The unprinted ink is delivered to a temporary holding or reconstitution tank having high and low level sensing means, and a pump is operated in response to the fluid level reaching the high level sensing means to deliver a quantity of collected fluid from the holding tank back to the supply system. Reconstitution is accomplished by metering into the holding tank a predetermined quantity of reconstitution or replenisher fluid, each time the low level sensing means is operated, so that the quantity of replenisher is always related to the quantity of ink returned by the catcher and therefore subject to evaporation.

7 Claims, 1 Drawing Figure

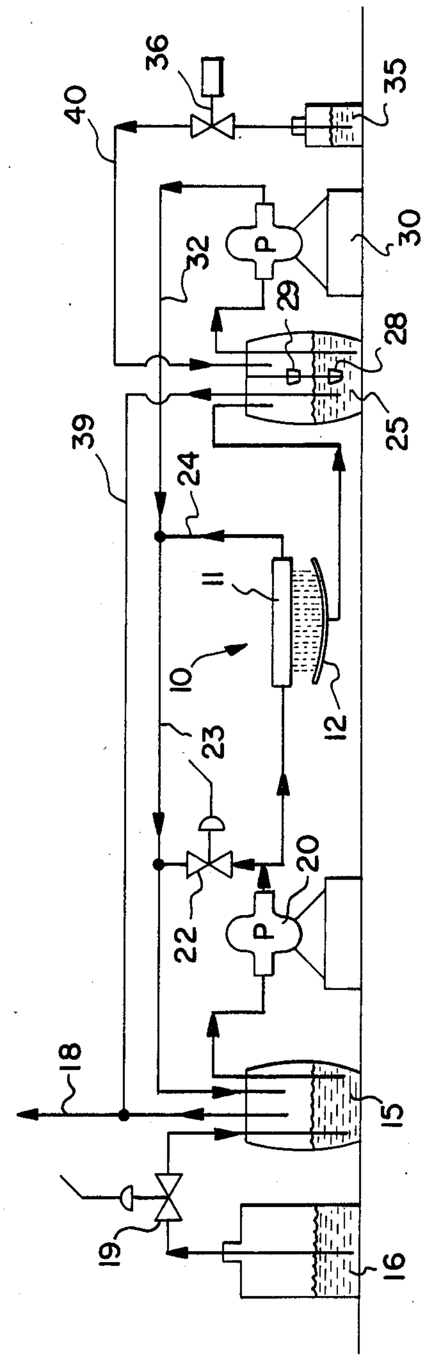
36
35
40
30
P
32
29
28
25
39
24
11
10
12
23
20
P
22
18
15
19
16

INK RECONSTITUTION SYSTEM AND METHOD FOR INK DROP PRINTER

BACKGROUND OF THE INVENTION

The problem of maintaining a proper consistency of the constituents in printing in ink drop printing systems, has been recognized in the art. Various schemes have been proposed and used for reconstituting the ink by adding solvents and the like, to compensate for loss of such solvents by evaporation in the printing ink which is collected and returned to the printing ink supply system. Most of the prior approaches either guess at or estimate the amount of solvent to be added from time to time, based upon an estimated exposure of the printing ink to the process of evaporation, or provide complex systems which depend for their operation upon the measurement of some parameter of the printing ink, such as by measuring the velocity of propagation of sound through the material, by measuring the specific gravity, or by measuring the conductivity. Inherently, the latter systems are necessarily complex.

The non-automatic systems, that is the systems which blindly add predetermined quantities of replenisher, have generally failed to take into account the fact that the system may need greater or lesser quantities of replenisher, depending upon the character of the material being printed. During the operation of an ink jet printer, it is known that the volume of ink in the principal supply system will gradually decrease as the ink drops are deposited on the printing receiving medium. Ideally, the volume lost in this matter is compensated for by the addition of fresh ink into the principal ink supply system. Further fluid loss results from evaporation of solvents from the ink. Since the fluid supply systems are generally closed, most of this evaporation occurs between the time that the drops leave the printhead and are caught by the catcher. If no printing were being accomplished, and all of the drops were being caught and returned to the ink system, the fluid loss would be entirely due to solvent evaporation, and the addition of a solvent or suitably constituted replenisher would be appropriate. On the other hand, if all of the drops produced by the printhead were being deposited on a print receiving medium, such as paper, none of the fluid would be lost as a result of evaporation and it would therefore be desirable to make this fluid loss up only by the addition of fresh ink. In actual operation, however, the fluid loss is a combination of both of these factors. Hitherto, blind or mechanical reconstituting systems have been incapable of distinguishing between conditions where the loss of fluid is primarily due to printing or primarily due to evaporation, and hence the more complex systems controlled by parameter measurements have come into being.

SUMMARY OF THE INVENTION

This invention is directed to a simplified system and method for replenishing or reconstituting printing ink in an ink jet printer, which operates only with ink withdrawn from the ink catcher and therefore only with ink which has been subject to essentially a single exposure to the atmosphere, and adds a predetermined amount of such replenisher to such exposed fluid prior to returning the exposed fluid plus replenisher to the principal source of printing ink in the system.

The method and apparatus of this application has the advantage of providing a uniform ink composition regardless of the amount of ink that is being caught by the catchers at any one time and returned to the system.

The present invention is an improvement over such prior systems which simply estimate the amount of solvent and the amount of fresh ink necessary for addition to the fluid system. In the present invention, the ink which is received from the catcher is delivered to a reconstitution reservoir or tank. Initially, the fluid level in the reservoir is low and is detected by a level sensor. A fixed or predetermined quantity of replenisher or solvent is then added to the reservoir. As the printer continues to operate, gradually additional ink from the catchers will accumulate in this reservoir until the fluid reaches a second or higher level which is detected by a second level sensor. Now the ink from the reconstitution reservoir, consisting solely of ink from the catcher which has been subject to evaporation and a fixed or measured quantity of replenisher, is returned to the principal ink supply reservoir and mixed with the fresh ink therein. This transfer or pumping action occurs until the fluid level in the reconstitution reservoir is lowered to the first or lower level. At this time, the cycle the repeats itself.

In the apparatus and method of this invention, since all of the ink from the catcher has been exposed to atmosphere, it can accurately be assumed that the only loss in fluid volume with respect to this portion of the ink, is a loss due to evaporation. Since this quantity between the low and high fluid level is a fixed quantity, and since the evaporation conditions are generally known, the amount of loss can be accurately predicted and made up by the application of solvent at this point.

It is accordingly an important object of the invention to provide a simplified yet effective apparatus and method for making up solvent losses in an ink supply system for an ink drop printer.

A further object of the invention is the provision of an ink supply system, as outlined above, where all of the ink from a collector is diverted to a reconstitution reservoir, in which predetermined or metered quantities of make-up fluid, such as solvent, are added in accordance with predetermined volumes of the returning ink, to provide a direct correlation between the volume of returning ink, and the volume of added solvent to compensate for evaporative loss.

These and other objects and advantages of the invention will be apparent from the following description, the accompanying drawings and the appended claims.

BRIEF DESCRIPTION OF THE DRAWING

The drawing schematically represents an ink supply and reconstitution system in accordance with this invention.

DESCRIPTION OF PREFERRED EMBODIMENTS

Referring to the figure of the drawing which illustrates a preferred embodiment of the invention, an ink jet print head is diagrammatically illustrated generally at 10 as including an ink manifold or applicator bar 11 and a catcher 12. The catcher 12 will collect substantially all of the ink drops which are not deposited on a medium being printed by the printer. For details regarding the construction of print head 10 reference may be made to Paranjpe, U.S. Pat. No. 4,085,409.

Means for supplying ink under a positive and regulated head of pressure to the applicator bar 11 includes a main reservoir 15 of ink. The reservoir 15 may be maintained at a general predetermined level or volume by make-up additions from a principal ink supply 16. The reservoir 15 may, for example, consist of be a float controlled vacuum tank device which will automatically maintain a predetermined level of ink, and will draw its make-up needs from the principal supply 16 of fresh ink, with the transfer being vacuum assisted by means of the vacuum line 18. A fresh ink addition valve 19 may be interposed in the line between the ink supply 16 and the main reservoir or tank 15 which may be manually or automatically operated, or may be omitted in lieu of an automatic level maintenance system, such as a float operated vacuum tank reservoir as previously noted.

Means for supplying ink from the reservoir 15 to the printer 10 includes a pump 20, and means for maintaining pressure regulation includes a pressure regulator valve 22 between the outlet of the pump 20 and a return line 23. The ink application system shown is the constant flow type and therefore ink from the reservoir 15 under a predetermined head, as maintained by the regulator valve 22, is applied to the bar 11, and the ink not used flows through the bar and returns by a line 24 to the return line 23 for return to the reservoir 15.

In accordance with this invention, all of the ink collected by the catcher 12 is delivered to a temporary holding tank in the form of a reconstitution reservoir 25. The reservoir 25 incorporates means defining low and high liquid positions, and for this purpose preferably incorporates liquid level responsive switches which, for example, may be float operated. In any event, the reservoir incorporates a first switch 28 which defines a predetermined low fluid position and a second switch 29 which defines the high fluid position. Obviously the quantity of fluid between the respective low and high limit positions is a known and fixed quantity.

Means for withdrawing fluid from the reconstitution reservoir 25 for delivery to the main reservoir 15 includes an ink return pump 30, the output of which is connected by a line 32 to the return line 23. The pump 30 is controlled by the respective lower and limit switches 28 and 29 so that the occurrence of a liquid level at the upper limit 29 operates to start the pump 30, and the occurrence of a liquid level at or below the lower limit 25 operates to terminate the operation of the pump 30.

The invention includes means for adding a predetermined amount of reconstitution or replenisher fluid, primarily solvent, to the reservoir 25, in a cyclic manner, so that the quantity of such replenisher is volumetrically related to the working volume of fluid in the reservoir 25 between the upper and lower limits. For this purpose there is provided a source or supply 35 of such reconstitution fluid. A controlled metering or delivery valve 36 is connected in a line 38 between the source 35 and the tank 25. Each operation of the valve 36 permits a predetermined quantity of fluid from the source 35 to be added to the reservoir 25, which is under vacuum from a branch 39 of the line 18. Accordingly, the valve 36 may simply be a time controllable valve which opens for an adjustable or predetermined time to permit a predetermined quantity of replenisher to pass through or may consist of a single cycle position displacement diaphragm or piston pawl which operates in a cycle of operation to inject a fixed quantity of replenisher to pass therethrough. The valve 36 is operated in timed relation to the filling an emptying of the tank by the pump 30.

The operation of the apparatus and method of this invention is largely self-evident from the foregoing description. During the jetting or printing operation, the ink is applied to ink bar 11 by the pump 20, which pump also recirculates ink back to the main ink reservoir 15 to control the pressure at the bar.

During the jetting or printing process, solvents are lost to evaporation, which, depending upon the character of the material being printed, may result to as much as 10–20% of the fluid level. The ink which is not printed but is caught in the catcher 12, is pulled by vacuum to the reconstitution reservoir 25 by vacuum applied to the vacuum line 18. It will be understood that the quantity of ink in the tank 25 will gradually increase from the low limit position of the switch 28 to the high limit position defined by the switch 29. This defines a known volume, and when the switch 29 is activated, pump 30 delivers this quantity of fluid back to the main reservoir 15. It is understood that the reservoir 15 has sufficient capacity to accept this return ink at any given time. When the ink level is drawn down to the position of switch 28, the operation of this switch not only shuts off pump 30, but it also activates valve 36 to deliver a predetermined quantity of the reconstitution fluid from the source 35 through a line 40 to the reservoir 25. This insertion of reconstitution fluid is preferably at the low level of the receiver 25 in order that mixing of the same with the ink from the catcher 12 can be accomplished during the refilling operation.

It will thus be seen that the amount of replenisher from the source 35 is dependent only upon the amount of ink being returned to the system by the catcher, and therefore dependent only upon the amount of ink which has been subject to an evaporative process. Thus, by adding a fixed amount of replenisher to this quantity of recirculated ink, the overall consistency and quality of the ink may be maintained regardless of whether a substantial or insubstantial quantity of ink is actually being applied by the printer to the medium being printed. In a broader sense, the invention contemplates volumetrically measuring, in discrete quantities or increments, all of the ink gathered by the collector, and then inserting into the ink supply system predetermined or discrete amounts of a reconstituting liquid or replensiher corresponding to or concurrently with each such increment of collector ink being measured, and preferably inserting replenisher dirctly into the discrete quantity and mixing the same, so that when the collected ink is returned to the primary ink source it has already been fully constituted.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An ink supply system for an ink drop printer for maintaining the consistency of the printing ink, comprising:

a main supply of printing ink, pump means for delivering said printing ink from said main supply to an ink drop printer, catcher means for collecting ink from said printer, means defining an ink return reservoir connected to receive ink from said catcher means and providing temporary storage thereof, level sensing switch means in said reservoir responsive to a low fluid level and to a high fluid level, pump means operable in response to said switch means when the ink reaches said high fluid level for withdrawing ink therefrom and delivery the same to the main supply until said ink reaches said low fluid level and defining a cycle of operation, a source of ink replenisher, and delivery valve means connected to said replenisher source and to said reservoir controlled by said switch means for delivering a predetermined quantity of ink replenisher from said source to said reservoir with each cycle of operation.

2. The system of claim 1 in which said pump means is operated by said switch means at the low fluid level so that mixing of said replenisher delivered by said valve means is accomplished during refilling of said reservoir from said catcher means.

3. In an ink supply system for an ink drop printer including a main ink reservoir, and pump means for delivering ink from said main reservoir to a printing bar under controlled pressure and return to the main reservoir, and including a drop catcher for collecting unprinted ink from said printing bar, the improvement for maintaining consistency of solvents and the like in said ink comprising:

an ink reconstituting tank, means for continuously delivering unprinted ink from said catcher to said tank, switch means in said tank defining a low liquid level and a high liquid level, a source of reconstituting fluid, means responsive to said switch means at said lower liquid level for delivering a predetermined metered quantity of reconstituting liquid from said reconstituting fluid source to said tank, and means responsive at said switch means at said high liquid level for withdrawing liquid from said tank for delivery of the tank contents to said main reservoir, and for terminating said withdrawing upon the liquid reaching said lower liquid level.

4. In an ink supply system for an ink drop printer, including a main ink reservoir and means for delivering ink from the main reservoir to the printing bar of an ink drop printer, and including a drop catcher for collecting ink which passes through the printing bar but is not deposited on a print receiving medium and thereby subject to evaporation and the like, the improvement for maintaining a consistency of solvents in said ink, comprising:

an ink constituting reservoir, means connected to deliver ink from said catcher to said reservoir, liquid level means associated with said reservoir for detecting a low liquid level therein and a high liquid level therein, a source of reconstituting fluid, means responsive to said liquid level means at said high liquid level for withdrawing liquid from said reservoir and for delivery of the same to the main ink reservoir, and for terminating said withdrawal in reponse to the liquid in said reservoir reaching the lower liquid level, and means connected to said source of reconstituting fluid and operable in response to the operation of said liquid level detector means for delivering a predetermined quantity of said reconstituting liquid from said source to said tank for mixing with ink from said catcher.

5. A method of maintaining the consistency of printing ink in the ink supply system of an ink drop printer, in which evaporation of solvents occurs to the ink component which is not printed but is caught in a catcher tray or the like and returned to the ink system, comprising the steps of:

collecting all of the non-printed ink in a catcher and delivering the same to a temporary holding vessel, defining fixed predetermined volumes of such collected ink for return to the system, mixing with each of said fixed volumes a predetermined amount of ink replenisher to make up for solvent loss in such quantities, which amount is exclusively related to said volumes, and returning said mixture to the ink supply system.

6. The method of reconstituting ink drop printing ink in an ink supply system during usage, in which at least some of such ink has been degraded by reason of evaporation, comprising the steps of:

applying said ink from a main source of said ink to an ink drop printer, collecting all of the non-printed droplets in a collector, delivering said ink from said collector to a holding container of predetermined volume, adding to said container a predetermined quantity of replenishing fluid which quantity is exclusively is related to the volume of said container to re-establish substantially the original consistency, and delivering said volume of reconstituted ink back to the main source of ink.

7. The method of reconstituting ink in an ink drop printing system which includes an ink jetting bar for applying ink drops to a print receiving medium, and a catcher for receiving ink drops not applied to such medium, comprising the steps of:

volumetrically measuring the quantity of ink received in said catcher in discrete increments of volume, and adding to said system discrete amount of a replenisher which amounts are in direct relation to the number of such increments of said volume being meausred.

* * * * *